(12) United States Patent
Jin et al.

(10) Patent No.: US 10,158,987 B2
(45) Date of Patent: Dec. 18, 2018

(54) INTERFERENCE REDUCTION USING SIGNAL QUALITY

(71) Applicant: AVAGO TECHNOLOGIES INTERNATIONAL SALES PTE. LIMITED, Singapore (SG)

(72) Inventors: Arthur Jin, San Diego, CA (US);
Lih-Feng Tsaur, San Diego, CA (US);
Chikan Kwan, San Diego, CA (US);
Erik John Rivard, San Diego, CA (US); Xin Tian, San Diego, CA (US);
Chaojing Sun, San Diego, CA (US);
Angel Polo, San Diego, CA (US)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 261 days.

(21) Appl. No.: 14/289,108

(22) Filed: May 28, 2014

(65) Prior Publication Data
US 2014/0357194 A1 Dec. 4, 2014

Related U.S. Application Data

(60) Provisional application No. 61/828,982, filed on May 30, 2013.

(51) Int. Cl.
*H04W 8/00* (2009.01)
*H04W 4/80* (2018.01)
(Continued)

(52) U.S. Cl.
CPC .......... *H04W 8/005* (2013.01); *H04B 17/318* (2015.01); *H04L 43/0847* (2013.01);
(Continued)

(58) Field of Classification Search
CPC combination set(s) only.
See application file for complete search history.

(56) References Cited

U.S. PATENT DOCUMENTS

2008/0069068 A1* 3/2008 Dean ..................... H04W 48/14
370/342
2009/0193052 A1* 7/2009 FitzGerald ............. G06Q 30/02
(Continued)

FOREIGN PATENT DOCUMENTS

EP 2512046 A2 * 3/2012 ............. H04H 60/43
EP 2512046 A2 * 10/2012 ............. H04H 60/43

OTHER PUBLICATIONS

Bluetooth Specification Version 4.0, Jun. 30, 2010.*
(Continued)

*Primary Examiner* — Yuwen Pan
*Assistant Examiner* — Zhitong Chen
(74) *Attorney, Agent, or Firm* — Foley & Lardner LLP (57) ABSTRACT

Techniques are described for interference reduction using, e.g., a Received Signal Strength Indicator (RSSI) or packet error rate threshold. UEs that implement these techniques may reduce interference among personal area network enabled devices, for example, with the added benefit of reducing power consumption by reduced RF transmissions. By reducing interference, the performance of personal area network devices may be improved.

19 Claims, 5 Drawing Sheets

(51) Int. Cl.
  *H04L 12/26* (2006.01)
  *H04W 52/24* (2009.01)
  *H04W 52/50* (2009.01)
  *H04B 17/318* (2015.01)

(52) U.S. Cl.
  CPC .......... *H04L 43/16* (2013.01); *H04W 52/245* (2013.01); *H04W 52/50* (2013.01); *H04W 4/80* (2018.02)

(56) References Cited

U.S. PATENT DOCUMENTS

| | | | | |
|---|---|---|---|---|
| 2010/0317289 | A1* | 12/2010 | Desai | H04B 17/318 455/41.2 |
| 2012/0003932 | A1* | 1/2012 | Zhodzishsky | H04W 52/0229 455/41.2 |
| 2013/0072146 | A1* | 3/2013 | Smith | H04L 47/24 455/404.1 |
| 2014/0213259 | A1* | 7/2014 | Teyeb | H04W 48/16 455/436 |
| 2014/0323087 | A1* | 10/2014 | Huang | H04W 48/16 455/411 |
| 2015/0181497 | A1* | 6/2015 | Sane | H04W 36/30 370/331 |

OTHER PUBLICATIONS

Bluetooth Special Interest Group, "Using Bluetooth Low Energy Wireless Technology Effectively," LE White Paper, Bluetooth SIG, Inc., Oct. 22, 2009, 18 pages.

Bluetooth Special Interest Group, Specification of the Bluetooth System—Master Table of Contents & Compliance Requirements, Covered Core Package version: 4.0, Bluetooth SIG, Inc., Jun. 30, 2010, 2302 pages.

* cited by examiner

INTERFERENCE REDUCTION USING SIGNAL QUALITY

CROSS REFERENCE TO RELATED APPLICATIONS

This application claims priority to provisional application Ser. No. 61/828,982, filed 30 May 2013, which is incorporated by reference in its entirety.

TECHNICAL FIELD

This disclosure relates to wireless communication, and avoiding interference with wireless communications.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at over 85% of the world's population. Improvements in wireless communication devices will help continue to make such devices attractive options for the consumer.

DETAILED DESCRIPTION

The discussion below focuses on interference reduction in wireless communication systems by reducing unintended responses to advertising messages. In some cases, an advertising station, such as a mobile device, peripheral, other user equipment, may broadcast an advertisement message. In some cases, the advertising station may be attempting to establish connectivity with an intended communication partner device or network. The broadcasted advertisement message may elicit responses from other incidental devices which are not the intended communication partner device. The responses from the incidental devices may interfere with or otherwise corrupt the connection establishment process with the intended communication partner, particularly when one or more unintended responders transmit a response at the same time or nearly the same time as the intended communication partner. In some implementations, devices receiving an advertising message may evaluate a signal quality characteristic, such as signal strength, an error rate, or other signal quality characteristic to determine if the advertising station is proximate to the device. If the device determines that the advertising station is not proximate to the device, the device may determine that its reception of the advertising message was incidental and that the device is not the intended communication partner of the advertising station. The device may then forgo responding to the advertising message.

The discussion below makes reference to user equipment. User equipment may take many different forms and have many different functions. As one example, user equipment may be a 2G, 3G, or 4G/LTE cellular phone capable of making and receiving wireless phone calls, and transmitting and receiving data. The user equipment may also be a smartphone that, in addition to making and receiving phone calls, runs any number or type of applications. User equipment may be virtually any device that transmits and receives information, including as additional examples a driver assistance module in a vehicle, an emergency transponder, a pager, a satellite television receiver, a networked stereo receiver, a computer system, music player, or virtually any other device. The techniques discussed below may also be implemented in an access point or other network controller that communicates with the user equipment (UE).

In many instances, UE may include a Bluetooth or other wireless transceiver. In an example busy environment where multiple Bluetooth Low Energy (BLE) UEs are implementing an Active Scan, there may be Radio Frequency (RF) packet collision resulting from multiple devices receiving an advertising message, such as an advertising packet for establishing a communication link or other advertising message, and responding at the same time or near in time. In some cases, the packet collision may arise because the response packets, for example, Scan Request or Connection Request packets, from different devices may use the same frequency at the same time or nearly the same time. In some cases, the frequency used for the Advertising packet may be used for the response packet. Further, response packets may have the same timing for different response devices. For example, responses may be sent 150 μs after the end of the advertising message. If one of the responding devices attempts to establish a communication channel and there is a collision, the communication establishment process may fail to establish a connection because of data loss due to packet collision. In some cases, the intended communication partner may be unaware that the communication channel was not successfully established and may begin sending data over the channel that failed to be established.

Described below are techniques for interference reduction using a signal quality characteristic, such as, signal strength (for example a Received Signal Strength Indicator (RSSI)), an error rate threshold (such as a packet error rate, bit error rate or other error rate), other signal quality characteristic or any combination of characteristics. UEs that implement these techniques may reduce interference among BLE-enabled and/or Bluetooth devices, for example, with the added benefit of reducing power consumption by reducing the number of RF transmissions made by the UE. By reducing interference, the performance of devices, such as BLE devices, may be improved. The UEs may implement the techniques in a wireless interface controller circuitry, and thereby avoid changes to the protocol stack or application software, supported by configuration settings. In some cases, the wireless interface controller circuitry may use default or modified configuration settings without having the host provide the settings.

In some implementations, the techniques described below may be implemented using modifications to the protocol stack or application software. For example, in some cases, such modifications may be deployed with a software update paired with existing hardware.

Figure 1:
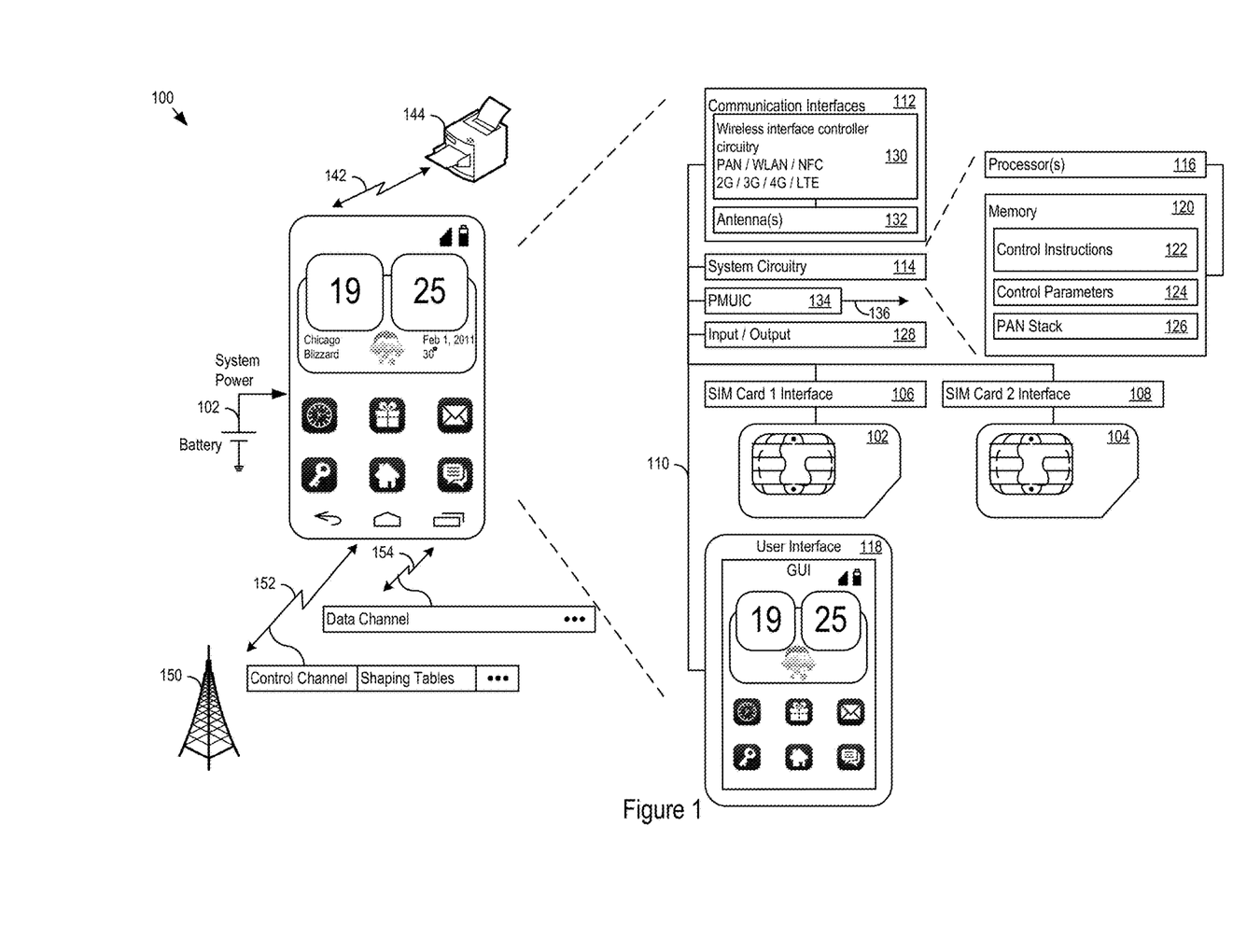
FIG. 1 shows an example of user equipment.

FIG. 1 shows an example of user equipment (UE) 100 that may include wireless communication, including PAN transceivers, such as Bluetooth and Bluetooth Low Energy transceivers. In this example, the UE 100 supports one or more Subscriber Identity Modules (SIMs), such as the SIM1 102 and the SIM2 104. An electrical and physical interface 106 connects SIM1 102 to the rest of the user equipment hardware, for example, through the system bus 110. Similarly, the electrical and physical interface 108 connects the SIM2 to the system bus 110.

As one example, UE may be a 2G, 3G, or 4G/LTE cellular phone capable of making and receiving wireless phone calls, and transmitting and receiving data using 802.11 a/b/g/n/ac/ad ("Wi-Fi"), Bluetooth (BT), Near Field Communications (NFC), or any other type of wireless technology. The UE may also be a smartphone that, in addition to making and receiving phone calls, runs any number or type of applications. UE may, however, be virtually any device that transmits and receives information, including as additional examples a driver assistance module in a vehicle, an emergency transponder, a pager, a satellite television receiver, a networked stereo receiver, a computer system, music player, or virtually any other device.

FIG. 1 shows an example of the UE 100 in communication with a network controller 150, such as an enhanced Node B (eNB) or other base station. The network controller 150 and UE 100 establish communication channels such as the control channel 152 and the data channel 154, and exchange data. In this example, the UE 100 supports one or more Subscriber Identity Modules (SIMs), such as the SIM1 102 and the SIM2 104. Electrical and physical interfaces 106 and 108 connect SIM1 102 and SIM2 104 to the rest of the user equipment hardware, for example, through the system bus 110.

The UE 100 includes communication interfaces 112, system circuitry 114, and a user interface 118. The system circuitry 114 may include any combination of hardware, software, firmware, or other logic. The system circuitry 114 may be implemented, for example, with one or more systems on a chip (SoC), application specific integrated circuits (ASIC), discrete analog and digital circuits, and other circuitry. The system circuitry 114 is part of the implementation of any desired functionality in the UE 100. In that regard, the system circuitry 114 may include logic that facilitates, as examples, decoding and playing music and video, e.g., MP3, MP4, MPEG, AVI, FLAG, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 118.

The user interface 118 and the input/output (I/O) interfaces 128 may include a graphical user interface, touch sensitive display, voice or facial recognition inputs, buttons, switches, speakers and other user interface elements. Additional examples of the I/O interfaces 128 include microphones, video and still image cameras, temperature sensors, vibration sensors, rotation and orientation sensors, headset and microphone input/output jacks, Universal Serial Bus (USB), Serial Advanced Technology Attachment (SATA), and Peripheral Component Interconnect express (PCIe) interfaces and connectors, memory card slots, radiation sensors (e.g., IR or RF sensors), and other types of inputs. The I/O interfaces 128 may further include Universal Serial Bus (USB) interfaces, audio outputs, magnetic or optical media interfaces (e.g., a CDROM or DVD drive), network (e.g., Ethernet or cable (e.g., DOCSIS) interfaces), or other types of serial, parallel, or network data interfaces.

The system circuitry 114 may include one or more processors 116 and memories 120. The memory 120 stores, for example, control instructions 122 that the processor 116 executes to carry out desired functionality for the UE 100. The control parameters 124 provide and specify configuration and operating options for the control instructions 122. The UE 100 may include a power management unit integrated circuit (PMUIC) 134. In a complex device like a smartphone, the PMUIC 134 may be responsible for generating as many as thirty (30) different power supply rails 136 for the circuitry in the UE 100. As will be explained in more detail below, the memory 120 may also store a PAN stack 126, such as a Bluetooth or BLE stack. The control parameters 124 may be user configurable and may include, as examples: operating mode, signal strength thresholds, and error rate thresholds, including low and high thresholds for the signal strength and/or error rate. The PAN wireless network interface controller may be used to establish a communication channel 142 with a peripheral device 144 or other PAN network device.

In the communication interfaces 112, the wireless interface controller circuitry 130 handles transmission and reception of signals through one or more antennas 132. The communication interface 112 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 112 may include transceivers that support transmission and reception under the 2G, 3G, BT, BLE, Wi-Fi, Universal Mobile Telecommunications System (UMTS), High Speed Packet Access (HSPA)+, and 4G/Long Term Evolution (LTE) standards. The techniques described below, however, are applicable to other wireless communications technologies whether arising from the 3rd Generation Partnership Project (3GPP), GSM Association, 3GPP2, IEEE, or other partnerships or standards bodies. As one specific example, the communication interface 112 may support transmission and reception under the Bluetooth and Bluetooth Low Energy (BLE) standards. The techniques described below, however, are applicable to other communications technologies.

As implementation examples, the communication interface 112 and system circuitry 114 may include BCM43341, BCM20702 or BCM4335 Bluetooth solutions, a BCM2091 EDGE/HSPA Multi-Mode, Multi-Band Cellular Transceiver and a BCM59056 advanced power management unit (PMU), controlled by a BCM28150 HSPA+SoC baseband smartphone processer or a BCM25331 Athena™ baseband processor. These devices or other similar system solutions may be extended as described below to provide the additional functionality described below. These integrated circuits, as well as other hardware and software implementation options for the user equipment 100, are available from Broadcom Corporation of Irvine Calif.

The control instructions 122 may be implemented in firmware, in an application executed by the processor 116, or in other manners. The wireless interface controller circuitry 130 may be configured limit the range at which responses are generated for advertising messages. The control instructions 122 may send an instruction message causing devices which are not in the vicinity to refrain from responding to advertising messages.

Figure 2:
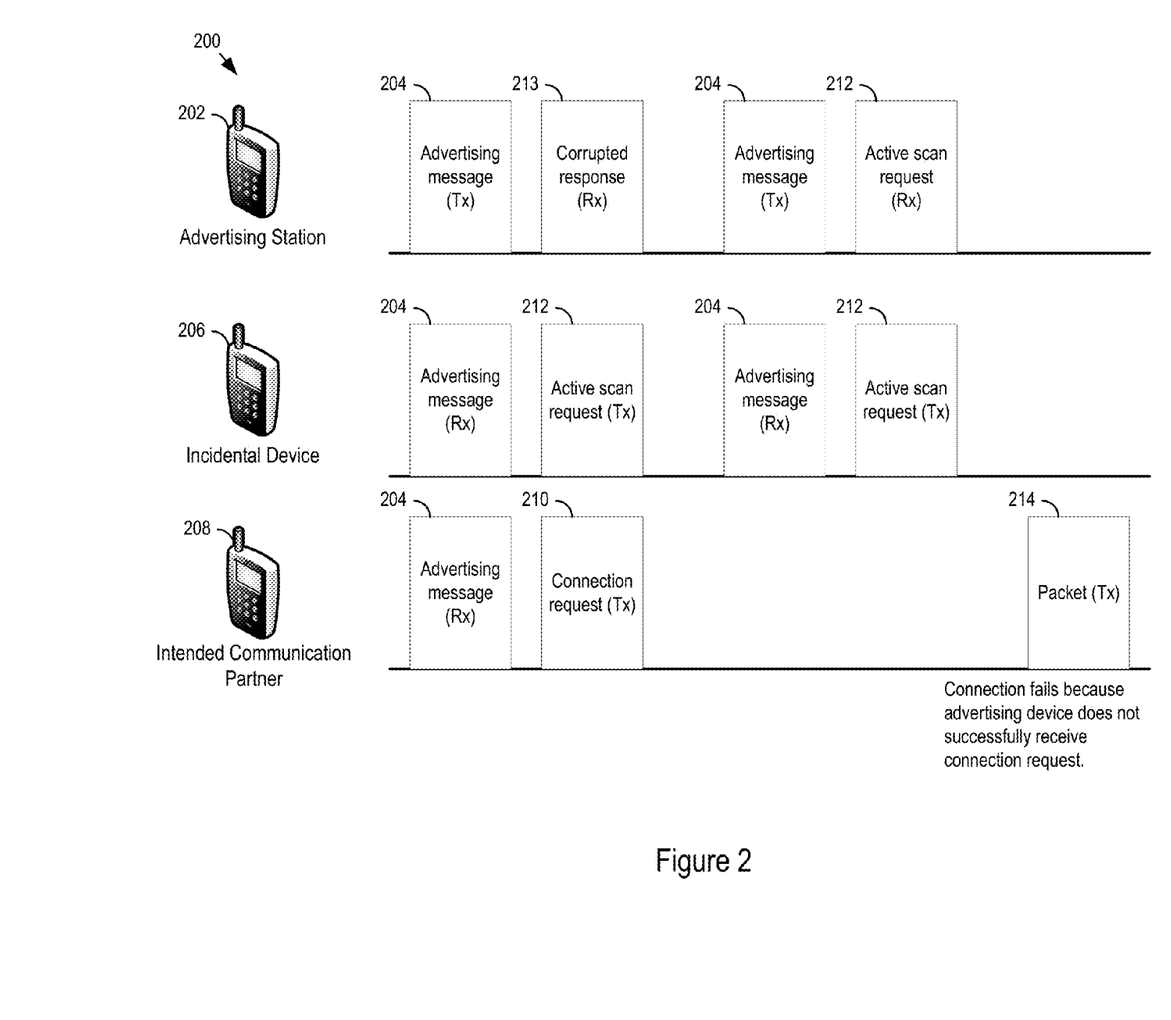
FIG. 2 shows an example communication environment in which multiple UEs are present.

FIG. 2 shows an example communication environment 200 in which multiple UEs are present. An advertising station 202 may broadcast an advertising message 204. The advertising message 204 may be detected by an incidental device 206, for example a device in an active scanning mode, set to respond to advertising messages. The advertising message may also be received by an intended communication partner 208 for the advertising station. The incidental device may respond with an active scan request 212 and the communication partner may respond with a connection request 210. The incidental device 206 and the intended communication partner 208 may respond at the same time, or nearly the same time. As a result, the responses 212, 210 from devices 206, 208 may collide. The collision may cause a corrupted response 213 to be received by the advertising station 202, and the corrupted response 213 may prevent the advertising device 202 from successfully establishing a communication channel with the intended communication partner 208. Note that the communication partner 208 may not be aware that the communication channel was not established and may waste the time, energy, and processing resources to send one or more data packets 214 which would not be received or processed by the advertising station 202.

Additionally or alternatively, the advertising station 202 may control the range over which its advertising messages are sent. For example, when an advertising station determines that a reduced number of responses may be desirable, or when instructed by an operator or application, the advertising station 202 may deliberately transmit an advertising message characterized by a reduced signal quality characteristic. The advertising device 202 may do so in order to increase the probability of successfully connecting to an intended communication partner by reducing the chance of responses from incidental devices. For example, the adjustment may be a reduction to the transmitted power of the advertising message compared to a nominal transmitted power used under ordinary circumstances. In some cases, more distant devices may be less likely to respond to the adjusted advertising message. This may be desirable because more distant devices may be less likely to be the intended communication partner of the advertising station.

In some implementations, the advertising station may use the signal quality characteristics of responses to the advertising message as control indicators for the signal level at which the advertising station broadcasts its advertising messages. The control circuitry in the advertising station may determine an upper threshold for the signal quality characteristics of messages sent in response to the advertising message. Signal quality characteristics for messages responsive to the advertising message above the upper threshold may indicate that too many devices are being excluded by the reduced transmit power of the advertising station. In some cases, the advertising station may receive no response to a transmitted advertising message. If the signal quality characteristic is above the threshold or no responses to the advertising message are received, the control circuitry may cause the advertising station to increase its transmit power. The increase may continue until the signal quality characteristics of the messages responsive to the advertising message fall below the upper threshold. In cases where no responses to an advertising message are received, the advertising device may increase the power responses to the advertising message are received.

Figure 3:
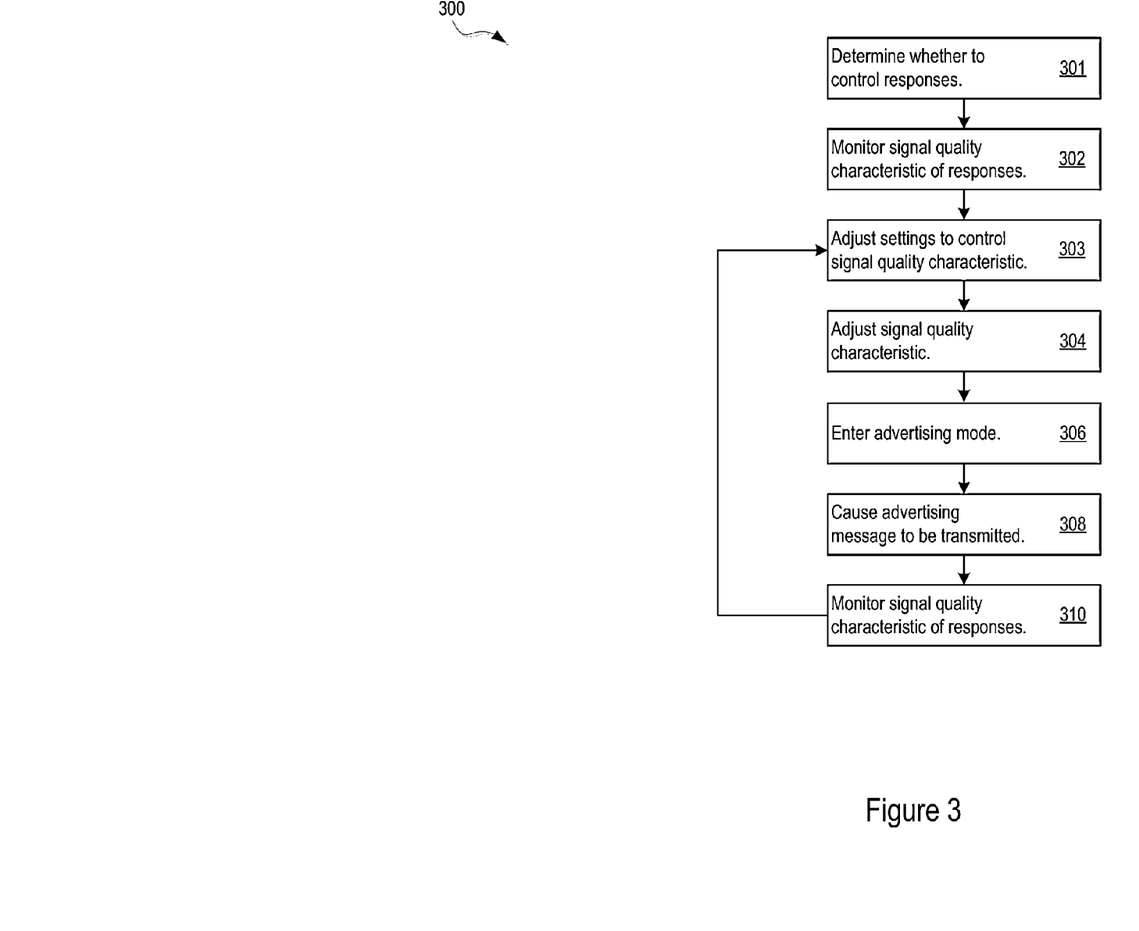
FIG. 3 shows example logic for advertising station response tuning.

FIG. 3 shows example logic 300 for advertising station response tuning. The logic 300 may determine whether to actively attempt to control responses to its own advertising messages (301). For example, the logic 300 may determine to control responses based on a setting, selection, instruction, command, or other input from an operator of the advertising station, an application executed by the advertising station, or from another entity. In another example, the logic 300 may determine to control responses based on detected PAN activity levels. For example, PAN activity, such as advertising messages, established connections, or other transmissions on frequencies used by the PAN, may be detected by the control circuitry. PAN activity above a selected threshold may indicate a region of high activity, may indicate an increased density of devices in the communication environment. The increased density may potentially cause an increased number of responses to advertising messages. An advertising station may monitor signal quality characteristics of response messages to its advertising messages (302). The advertising station may determine to adjust its settings to control the signal quality characteristics of the received response messages (303). For example, the logic 300 may adjust thresholds for received signal quality characteristics (e.g. upper or lower bounds). In another example, the logic may select signal quality characteristics for its own advertising message transmission. The logic may adjust signal according to selected adjustment a signal quality characteristic responsive to the determination (304). For example, the logic 300 may reduce the transmission power of the advertising station response to a determination to reduce the number of responses. The device may enter an advertising mode (306). For example, the advertising station may be attempting to establish a connection or pair with a communication partner and may enter into an advertising or discoverable mode. The logic 300 may cause an advertising message to be transmitted with the reduced signal quality characteristic (308). The logic 300 may monitor responses following the adjustment (310). If the signal quality characteristics of the response messages fall out of bounds, the logic 300 may again adjust the advertisement message settings (303).

Figure 4:
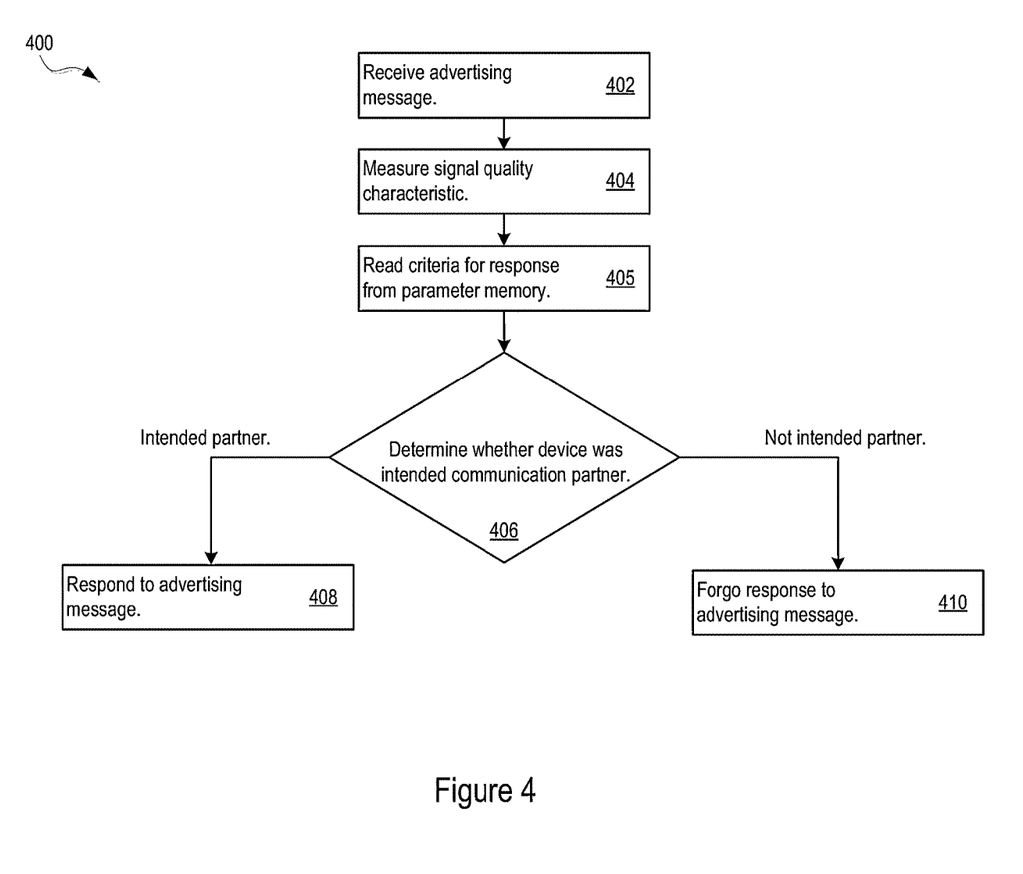
FIG. 4 shows example logic for response control at a receiving device

FIG. 4 shows example logic 400 for response control at a receiving device. The receiving device may receive an advertising message from an advertising station (402). The logic 400 may measure a signal quality characteristic of the advertising message (404). For example, the logic 400 may measure a signal strength (e.g. RSSI) or error rate associated with the advertising message. The logic 400 may read criteria for response from a parameter memory in the receiving device (405). The logic 400 may use the measured signal quality characteristic and the accessed criteria to determine whether to transmit a response to the advertising message. This check may reflect a determination by the receiving device as to whether it was an intended communication partner of advertising station (406). The check may be based on one or more criteria for response. In an example, the logic 400 may determine if the signal quality characteristic indicates that the advertising station is proximate to the receiving device. To accomplish the determination of proximity, the receiving device may compare the signal quality characteristic to one or more thresholds. For example, meeting the criteria may include the signal strength of the received advertisement message being above a selected threshold. In an example, meeting the criteria may include the error of the received advertisement message being below another selected threshold. In some cases, if the signal quality characteristic of the advertising message meets the threshold, then the receiving device determines that, e.g., it is proximate to the advertising station and that the receiving device is an intended communication partner. If the advertising message meets the threshold criterion (which may indicate that the receiving device is determined to be an intended communication partner of the advertising station), then the receiving device may respond to the advertising message (408). For example, the receiving device may respond with an active scan request. In another example, the receiving device may respond with an attempt to establish a communication channel. If the advertising message fails to meet the threshold criterion (which may indicate that the receiving device has incidentally received the advertising message), then the receiving device may forgo responding to the advertising message (410).

In some implementations, the logic 400 may be activated by an operator or application controlled setting. Such settings may also be used to control thresholds or other metrics for determining if the receiving device is the intended communication partner. In various implementations, the setting may be controlled or partially controlled by the receiving device. For example, the receiving device may monitor ambient PAN activity levels. In areas with high levels of detected activity (e.g. above a selected activity threshold), the logic 400 may be activated to prevent increased incidental responses. Further, the thresholds may be set by the wireless interface controller circuitry on the receiving device. For example, the signal quality characteristic threshold may be determined based on historical levels at which connections are established. For example, a signal strength from a previous connection may be used as a reference threshold for future connections. The previous connection may have been made with operator input. For example, the logic 400 may have declined to establish a connection in response to an advertising message, and an operator may have overridden the logic 400. In some cases, the logic 400 may update the signal quality threshold to ensure that future connections with similar quality characteristics are not declined.

Figure 5:
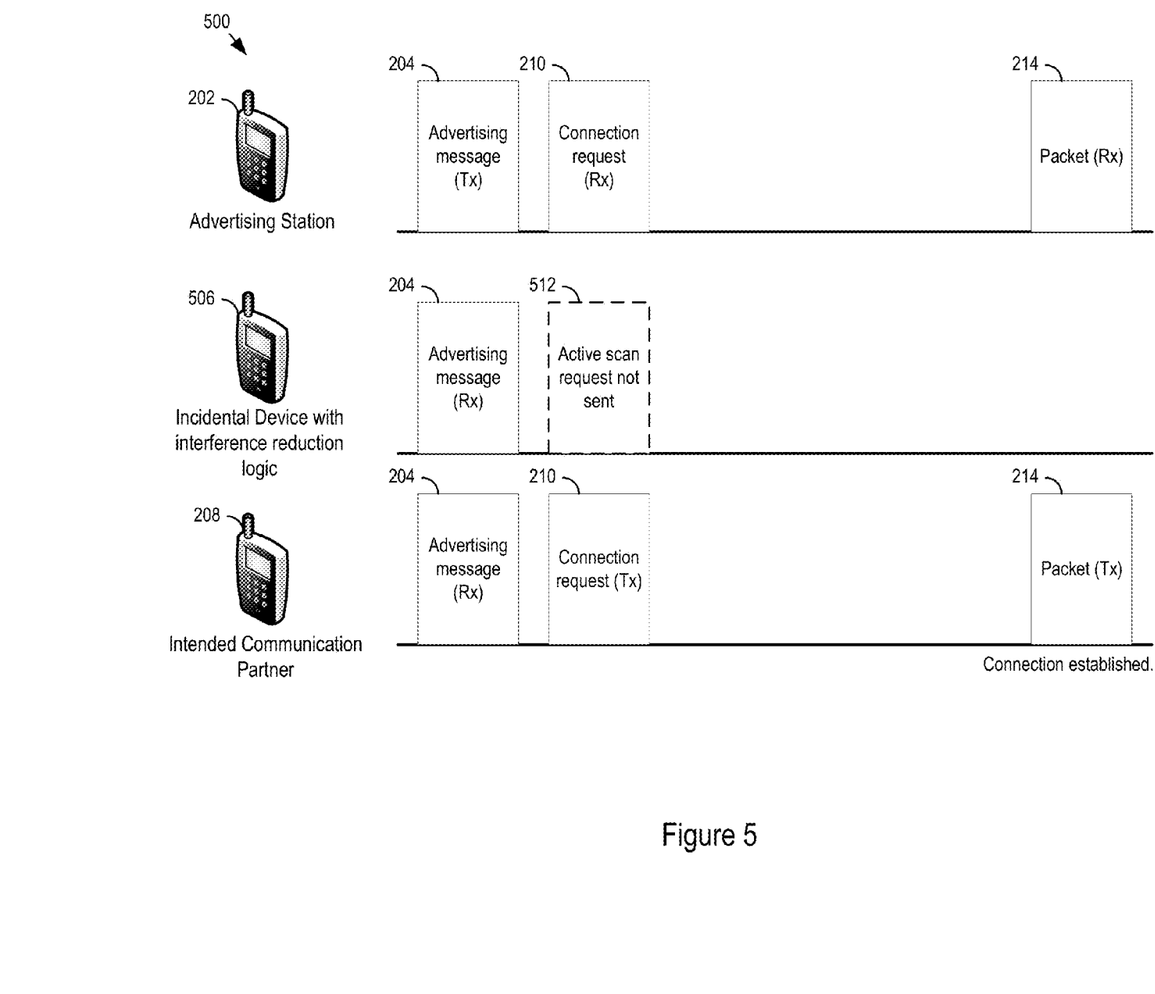
FIG. 5 shows an example communication environment in which multiple UEs are present.

FIG. 5 shows an example communication environment 500 in which multiple UEs are present. An advertising station 202 may broadcast an advertising message 204. The advertising message 204 may be detected by an incidental device 506, for example a device in an active scanning mode, set to respond to advertising messages. In the example environment, the incidental device may include logic for response control (e.g., logic 400). The advertising message may also be received by an intended communication partner 208 for the advertising station. Based on one or more signal quality characteristics of the received advertising message 204, the incidental device 506 may forgo 512 sending an active scan request in response to the advertising message. For example, the advertising message 204 may have a signal strength below a selected threshold with received by the incidental device 506. In another example, the advertising message may have an error rate greater than another selected threshold. In either example, the incidental device 506 may forgo generating and sending a response to the advertising message. The intended communication partner 208 may respond be sending a connection request 210. The connection request 210 may be received by the advertising station and a connection may be successfully established. The intended communication partner 208 may then transmit data packets 214 over the connection.

In some implementations, the techniques and architectures discussed above may be applied to Bluetooth and BLE systems. For example an advertising station implementing BLE may determine to reduce responses to one or more of its advertising packets. In some implementations, this feature may be implemented using the advertising (ADV) mode bit group. The BLE controller of the advertising station may detect packet collisions from incidental devices by measuring received RF power and the ambient RF noise level. For example, the received RF power can be measured during the expected transmission window of the responding devices. In the example, the ambient RF noise level can be measured during a period of expected silence (e.g. the Inter-Frame-Spacing (IFS) or other silent periods). If received RF power is high relative to the ambient noise but the advertising device does not successfully receive a packet, advertising device may assume that a packet collision occurred. Another example is to monitor the CRC error rate on received ScanRequest or ConnRequest packets. The BLE controller circuitry may also monitor RSSI values for received ScanRequest or ConnRequest packets. This information may be analyzed using response reduction logic (e.g. logic 300). If packet collision rate is too high (e.g., above a threshold ErrorRate_high), the advertising BLE device may reduce its transmit power to decrease its range until the packet collision rate is reduced to an acceptable level (e.g., below a threshold ErrorRate_low). To assist the advertising station in regulating its transmit power, receiving devices may include the RSSI values as part of their ScanRequest packets and the information may be used by the response reduction logic.

In another example in BLE Active Scan or Initiating Scan devices, the BLE controller may monitor the RSSI values for received advertising packets and Scan Response packets. In some implementations, this feature may be enabled using the ADV mode bit set. The BLE controller may send ScanRequest or ConnRequest when the RSSI value is above a threshold (e.g., above a threshold Rssi_threshold). The BLE controller may include RSSI information in some or all of the ScanRequest packets to assist the advertising station in transmit power regulation.

In another example, a BLE controller may include setting for activation of Interference Reduction using RSSI and/or Packet Error Rate thresholds. In the example, the feature may include an advertising mode bit setting. The feature may enable advertising power control when active. In some implementations, this feature may be enabled using the ADV mode bit set. When the CRC error rate of received ScanRequest packets is above ErrorRate_high, the BLE controller may reduce the advertising transmit power until the CRC error rate falls to or below ErrorRate_low or until no ScanRequest packets are received. In some cases, the lowest power setting may be bounded by the minimum transmit power of the advertising station. When the Advertising station does not receive any ScanRequest packets (or other response packets) and/or the CRC error rate is below ErrorRate_low, the BLE controller may increase the transmit power until ErrorRate_low is exceeded and/or ScanRequest packets are received. The power increase may be bounded by the maximum transmit power of the advertising station. In some cases, a HCl_Reset command need not change the mode or settings.

In another example, in a BLE device performing an active scan, the receiving device may make a determination whether to respond using and RSSI and/or Packet Error Rate threshold. In some implementations, this feature may be enabled using the ActiveScan mode bit set. The receiving BLE device in an Active Scan may send a ScanRequest when the RSSI for a received advertising packet is at or above RssiThreshold. The receiving BLE device may refrain from responding with a ScanRequest when the RSSI for a received advertising packet is below RssiThreshold. In some implementations, the feature can be disabled while "Scan" is active on the receiving device. In some cases, a HCl_Reset command need not change the mode or settings.

In another example, in a BLE device initiating a connection, the receiving device may make a determination whether to respond using and RSSI and/or Packet Error Rate threshold. In some implementations, this feature may be enabled using the InitScan mode bit set. The receiving BLE device initiating a connection may send a ConnRequest when the RSSI for a received advertising packet is at or above RssiThreshold. The receiving BLE device may refrain from responding with a ConnRequest when the RSSI for a received advertising packet is below RssiThreshold. In some implementations, the feature can be disabled while "Init" is active on the receiving device. In some cases, a HCI_Reset command need not change the mode or settings.

Host-Controller Interface

The host-controller interface (HCI) commands described below may be implemented to allow for enabling, disabling, and configuring some of the example BLE interference reduction features discussed above. The example LE_IR_Cfg command may be used select the parameters for interference reduction. The example numerical values and data widths discussed below may be used in some implementations. Other values as widths may be used in various implementations. The example LE_IR_Cfg command may be used to enable, disable, and configure the LE Interference Reduction feature. In various implementations, parameters different from the example parameters listed below may be used.

| | | Format | |
|---|---|---|---|
| Command | OCF | Command Parameters | Return Parameters |
| 5.2.2 LE_IR_Cfg | Vendor Specific or set by standard committee | Action, Mode, [RssiThreshold, ErrorRate_low, ErrorRate_high] | Status Action [for "read action: Mode, RssiThreshold, ErrorRate_low, ErrorRate_high] |

| Parameters | |
|---|---|
| Value | Description |
| Action: 1 Octet | |
| 0x00 | Write the configuration |
| 0x01 | Read the configuration |
| Mode: 1 Octet (only when Action = "Write") | |
| 0x00 (all bits are cleared) | Feature is disabled |
| Bit 0 | Enable "LE Interference Reduction" in ActiveScan |
| Bit 1 | Enable "LE Interference Reduction" in InitScan |
| Bit 2 | Enable "LE Interference Reduction" in ADV |
| RssiThreshold: 1 Octet (only when Action = "Write") | |
| 1 Octet | The RSSI threshold, used by ActiveScan and InitScan Range: [−127, 20] ScanRequest/ConnRequest may be sent when the RSSI of a received ADV packet is at or above this level ErrorRate_low (Error Rate Low Threshold): 2 Octet (only when Action = "Write") |
| 2 Octet (e.g., 50 for 0.5%) | Error rate low threshold. Unit: 0.01%. Range: [0, 10000] |
| ErrorRate_high (Error Rate High Threshold): 2 Octet (only when Action = "Write") | |
| 2 Octet (e.g., 300 for 3%) | Error rate high threshold. Unit: 0.01%. Range: [0, 10000] |

| Return Parameters | |
|---|---|
| Status: Size: 1 Octet | |
| Value | Description |
| 0x00 | Success |
| 0x12 | Error: Error in command parameters |

Action: same description as in the command
When Action is "Read", the existing configuration is returned. Their descriptions are the same as in the command.

The following example command sequences may be used to implement advertising power control and/or interference reduction:

Command Sequence to enable/change LE Interference Reduction
LE_IR_Cfg/"LE Configure Interference Reduction"
Select,
"Action": "Write"
"Mode": set corresponding bit(s) for ActiveScan, InitScan, and Adv
"RssiThreshold": select the RSSI threshold value
"ErrorRate_low": CRC error rate low threshold "ErrorRate_high": CRC error rate high threshold Command Sequence to disable LE Interference Reduction for all
LE_IR_Cfg/"LE Configure Interference Reduction"
Select,
"Action": "Write"
"Mode": No bits set.

Command Sequence to Read LE Interference Reduction Settings
LE_IR_Cfg/"LE Configure Interference Reduction"
Select,
"Action": "Read"

In various implementations, other commands and command sequences may be used to enable, disable, and/or configure the features discussed above.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an ASIC, Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A device, comprising:
    a personal area network (PAN) transceiver configured to:
        receive at the device, from an advertising station, an advertisement message, the advertisement message comprising a request to establish a new communication channel with the advertising station;
        responsive to the advertisement message, determine a signal strength for a wireless signal which carried the advertisement message; and
        communicate with the advertising station to establish the new communication channel; and
    PAN controller circuitry coupled to the PAN transceiver, the PAN controller circuitry configured to:
        access a record comprising information about a historical signal strength at which a past communication channel was established;
        responsive to the record, set a threshold for the signal strength;
        monitor an ambient activity level of a PAN;
        adjust the threshold according to the ambient activity level of the PAN;
        determine whether the signal strength is above the threshold;
        responsive to determining that the signal strength is above the threshold, cause the PAN transceiver to send a response to the advertising station to establish the new communication channel, the response comprising information of the signal strength; and
        responsive to determining that the signal strength is below the threshold, forgo generating and sending the response to the advertisement message.

2. The device of claim 1, wherein the PAN controller circuitry is configured to have a reduced probability of response to the advertisement message when the advertising station intentionally reduces the signal strength of the wireless signal.

3. The device of claim 1, wherein the PAN controller circuitry is configured to determine that:
    the device is an intended communication partner with the advertising station when the device is determined to be proximate to the advertising station; and
    the device is an incidental communication partner with the advertising station when the device is determined to be not proximate to the advertising station.

4. A method, comprising:
    accessing a record of a historical signal quality level at which a past communication channel was established;
    responsive to the record, setting a signal quality threshold;
    monitoring an ambient activity level of a personal area network (PAN);
    adjusting the signal quality threshold according to the ambient activity level of the PAN;
    receiving an advertisement message via an over-the-air protocol;
    determining a signal quality characteristic for the advertisement message;
    comparing the signal quality characteristic to the signal quality threshold;
    responsive to determining, via the comparing, that the signal quality characteristic exceeds the signal quality threshold, transmitting a response to the advertisement message, the response comprising the determined signal quality characteristic; and
    when the signal quality characteristic fails to exceed the signal quality threshold, forgoing generating and sending the response to the advertisement message.

5. The method of claim 4, wherein determining the signal quality characteristic comprises determining a signal strength.

6. The method of claim 4, wherein determining the signal quality characteristic comprises determining an error rate.

7. The method of claim 4, further comprising activating an interference reduction setting on a device, the interference reduction setting allowing discrimination of the advertisement message based on the signal quality characteristic.

8. The method of claim 7, wherein activating the interference reduction setting on the device comprises intentionally reducing the signal quality characteristic of the advertisement message to reduce a probability of response.

9. The method of claim 4, wherein transmitting the response comprises transmitting a request for a connection.

10. The method of claim 4, wherein transmitting the response comprises transmitting a response to an active scan.

11. The method of claim 4, further comprising determining if a device that received the advertisement message is an intended recipient responsive to the signal quality threshold.

12. The method of claim 4, further comprising monitoring an ambient activity level for the over-the-air protocol.

13. A device, comprising:
    a transceiver configured to:
        receive, from a transmitter, an advertisement message via a wireless protocol; and
        determine a signal quality characteristic for the advertisement message; and wireless interface controller circuitry configured to:

access a record based on a historical signal quality level at which a past communication channel was established;

responsive to the record, set a signal quality threshold;

monitor an ambient activity level of a personal area network (PAN);

adjust the signal quality threshold according to the ambient activity level of the PAN;

determine whether the signal quality characteristic for the advertisement message exceeds the signal quality threshold;

responsive to determining that the signal quality characteristic exceeds the signal quality threshold, cause the transceiver to transmit a response to the advertisement message, the response comprising the determined signal quality characteristic; and when the signal quality threshold is not exceeded, forgo generating and transmitting the response to the advertisement message.

14. The device of claim 13, wherein:

the signal quality characteristic comprises a signal strength; and the transceiver comprises a detector configured to measure the signal strength.

15. The device of claim 13, wherein the wireless interface controller circuitry is configured to determine if the device is an intended recipient responsive to the signal quality threshold.

16. The device of claim 13, wherein the wireless interface controller circuitry is configured to have a reduced probability of response to the advertisement message when the transmitter intentionally reduces the signal quality characteristic of the advertisement message.

17. The device of claim 13, wherein:

the signal quality characteristic comprises an error rate; and the transceiver comprises a detector configured to measure the error rate.

18. The device of claim 13, wherein the transceiver is configured to transmit the response by transmitting a request for a connection.

19. The device of claim 13, wherein the transceiver is configured to transmit the response by transmitting a response to an active scan.

* * * * *